United States Patent [19]
Frater et al.

[11] Patent Number: 6,069,773
[45] Date of Patent: May 30, 2000

[54] SHOCK PROTECTED HIGH STACK DENSITY SUSPENSION SYSTEM

[75] Inventors: Norman Kermit Frater, San Jose; Thomas Mark Hoffmann, Santa Cruz; Donald Harold Ingalls, Gilroy; Bradley John Kriehn, San Jose, all of Calif.

[73] Assignee: International Business Machines Corporation, Armonk, N.Y.

[21] Appl. No.: 09/128,361

[22] Filed: Aug. 3, 1998

Related U.S. Application Data

[63] Continuation of application No. 08/566,219, Dec. 1, 1995, Pat. No. 5,838,517.

[51] Int. Cl.$^7$ .................................................. G11B 5/48
[52] U.S. Cl. ............................................................. 360/104
[58] Field of Search ................................... 360/103–106

[56] References Cited

U.S. PATENT DOCUMENTS

| | | | |
|---|---|---|---|
| 4,724,500 | 2/1988 | Dalziel | 360/103 |
| 4,922,356 | 5/1990 | Yamaguchi et al. | 360/104 |
| 5,027,241 | 6/1991 | Hatch et al. | 360/104 |
| 5,333,085 | 7/1994 | Prentice et al. | 360/104 |
| 5,537,269 | 7/1996 | Zarouri | 360/104 |
| 5,636,088 | 6/1997 | Yamamoto et al. | 360/104 |
| 5,659,448 | 8/1997 | Shimizu et al. | 360/104 |
| 5,666,241 | 9/1997 | Summers | 360/104 |
| 5,734,524 | 3/1998 | Ruiz | 360/104 |
| 5,839,193 | 11/1998 | Bennin et al. | 360/104 |
| 5,886,857 | 3/1999 | Symons et al. | 360/104 |

FOREIGN PATENT DOCUMENTS

| | | | |
|---|---|---|---|
| 0012975 | 7/1980 | European Pat. Off. | 360/104 |
| 012 975 A2 | 7/1980 | European Pat. Off. | |
| 0 656 622 A1 | 6/1995 | European Pat. Off. | |
| 58-36368 | 2/1984 | Japan | 360/104 |
| 59-221872 | 12/1984 | Japan | |
| 60-167172 | 8/1985 | Japan | |
| 1-62876 | 3/1989 | Japan | |
| 3008168 | 1/1991 | Japan | |
| 5006608 | 1/1993 | Japan | |
| WO 82/01439 | 4/1982 | WIPO | |

OTHER PUBLICATIONS

"Comb Merge Flexure Feature", disclosed anonymously, 31979, *Research Disclosure*, Nov. 1990.

*Primary Examiner*—Allen T. Cao
*Attorney, Agent, or Firm*—Gray Cary Ware Freidenrich

[57] ABSTRACT

A uniquely configured flexure tongue of a head/gimbal assembly (HGA) provides for parallel positioning of a slider air bearing surface (ABS) during merge and a limitation of pitch of the slider during non-merge. A cantilevered end of the flexure tongue is provided with a finger extension which can be employed for merge operations and a remainder cantilevered end portion adjacent a base of the finger can be employed for limiting pitch of the slider. When a merge comb engages multiple flexure fingers of multiple suspensions in a head stack assembly the air bearing surfaces of the sliders are positioned parallel with respect to one another. This allows maximum disk stack density when a head stack assembly is merged with a head stack assembly. The flexure finger allows various arrangements to be employed for implementing a merge. The present invention also cooperates with a prior art roll limiter so that during merge a three point fixation normalizes a slider at zero pitch.

5 Claims, 13 Drawing Sheets

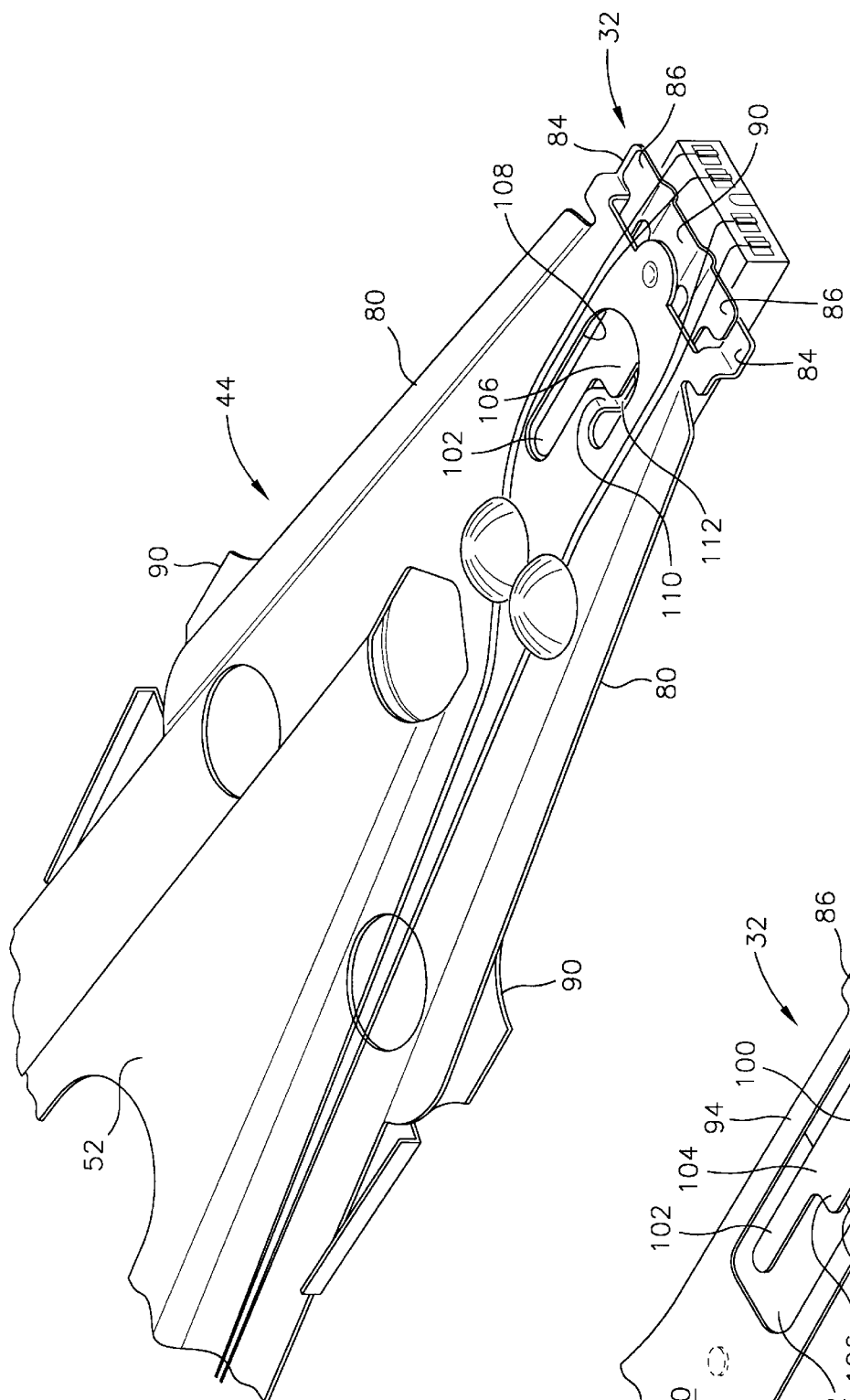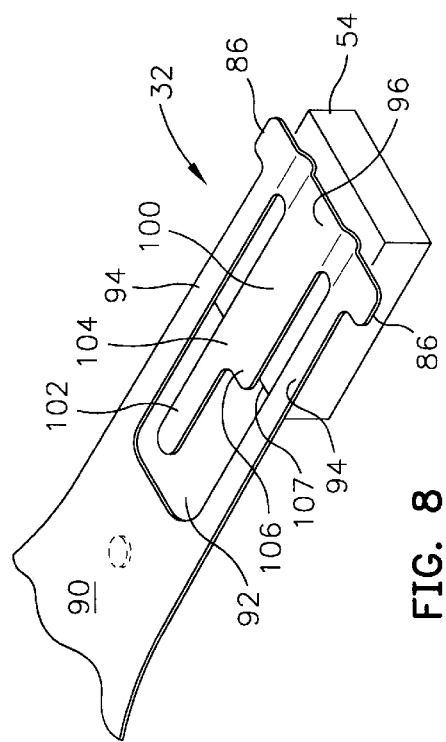

SHOCK PROTECTED HIGH STACK DENSITY SUSPENSION SYSTEM

This is a continuation of Ser. No. 08/566,219 filed Dec. 1, 1995 now U.S. Pat. No. 5,838,517.

BACKGROUND OF THE INVENTION

1. Field of the Invention

The present invention relates to a shock protected high stack density suspension system and more particularly to a plurality of such suspension systems which are shock protected during manufacture, during assembly in a head stack assembly, during assembly in a disk stack assembly, and after assembly.

2. Background of the Invention

Suspension systems are employed in magnetic disk drives. A suspension system includes a head/gimbal assembly (HGA) which is connected to an outer end ("suspended" end) of a load beam. The HGA includes a flexure having a window bounded in part by a pair of flexure legs and an outer terminal end portion. Extending inward from the outer terminal end portion is a flexure tongue which is cantilevered into the window. A slider, carrying a magnetic head, is mounted at its top to a bottom of the tongue. A bottom surface of the slider and a pole tip portion of the magnetic head form an air bearing surface (ABS). An inner end of the load beam is connected to an actuator for moving the ABS across a surface of a magnetic disk while a spring force of the load beam preloads the ABS of the slider toward the magnetic disk. When the disk is rotated, the ABS of the slider is supported ("flies") a slight distance from the surface of the disk, in the order of 0.075 um, on a cushion of air (air bearing) which counterbalances the preloading, the air bearing being created by the rotating disk. The actuator then moves the load beam to position one or more sliders at desired concentric tracks on the disks for reading and writing by the magnetic heads. The slider is gimbal supported by the suspension as it flies with respect to the disk.

The connection of the flexure to the load beam is made between a top inner end of the flexure and a bottom of the load beam. A top of the tongue has a load dome that is engaged by the bottom of the load beam at a pivot point. During flight of the slider, slight pitching and rolling movements of the slider are supported by gimballing action of the flexure tongue about the pivot point, the gimballing action in turn being supported by flexure of the legs and terminal end portion of the flexure. In the prior art non-operational roll of the slider is limited by engagement of wings on the flexure with tabs on the load beam.

A high capacity magnetic disk drive employs a plurality of double sided magnetic disks in a disk stack assembly and a plurality of suspension systems in a head stack assembly. The suspension systems, which are supported by an actuator assembly, are interleaved between the disks so that each side of each disk can be read and written by a respective magnetic head. Sliders of top and bottom suspensions in the stack face top and bottom surfaces of top and bottom disks and sliders of each pair of suspension systems between the top and bottom suspensions face opposing surfaces of a respective pair of disks.

Each suspension system is a delicate component before and after its incorporation into a disk drive. The flexure of the HGA is a very thin sheet of metal which can be easily bent under shock loading. At times shock loading may be intense enough to permanently bend the flexure by moving the flexure tongue away from the load beam until its elastic limit has been exceeded. A first improvement is adding roll limiters as taught in the prior art. Once the roll limiters are engaged during a shock event the slider rotates further in pitch. When a flexure tongue is permanently bent, the suspension must be discarded since preloading and gimballing action of the HGA will be unacceptably altered. Unfortunately, intense shock loading can occur during manufacture and even after installation in a disk drive. During manufacture suspensions are transported in trays which can be jostled. After installation the frame supporting the disk drive can be jarred, such as by dropping a laptop computer. Such jarring can cause permanent damage of a suspension which renders a disk drive inoperable.

Various schemes have been proposed to limit the pitch of the HGA. According to one such proposal, the terminal end of a flexure is provided with a pair of tabs that extend over the top of the terminal end of the load beam. As is known, such tabs do not restrict pitch enough to prevent bending of the flexure.

Another pitch limiting scheme is taught in U.S. Pat. No. 5,333,085 wherein a tab is provided on the cantilevered end of the flexure tongue which extends over the top of the load beam through an aperture in the load beam. However, such a tab prevents flexure tongues in a head stack assembly from being compressed by a merge comb when the head stack assembly is installed in the disk stack assembly. A merge comb looks similar to a hair comb; it includes a plurality of fingers which can be interleaved with a column of tongues in a head stack assembly to prevent preloading while maintaining the suspensions in a retracted position until the air bearing surfaces of the sliders assume a parallel relationship. When the air bearing surfaces are parallel each pair of suspensions assumes its lowest height dimension thereby limiting the minimum distance at which disks can be spaced in the disk stack assembly. Accordingly, after assembly of a plurality of suspensions in a head stack assembly the merge comb is placed to merge the suspensions and then the head stack assembly is installed in the disk stack assembly. During installation, the spacing between the air bearing surfaces of the HGAs is very small. If the merge comb cannot obtain a parallel relationship between the sliders then the spacing between disks must be increased in order to permit the head stack assembly to be installed in the disk stack assembly without the sliders engaging and scraping across the surfaces of the disks. Manifestly when the distance between disks in a disk stack assembly increases, disk stacking density is lessened thereby reducing the bit density of the disk drive. In order for a merge comb to perform its intended function, the cantilevered end of a flexure tongue must be adapted for engagement with a finger of the merge comb. This is not practical if the cantilevered end of the flexure tongue has a tab for limiting pitch movement of the flexure. Accordingly, there is a strong felt need for flexure tongues which will limit pitch of flexures and yet cooperate with a merge comb for retracting sliders with their air bearing surfaces parallel with respect to one another.

SUMMARY OF THE INVENTION

The present invention provides novel embodiments of the cantilevered end of the flexure tongue of an HGA for limiting pitch of the flexure tongue and for cooperating with a merge comb to implement a desirable merge of multiple suspensions. The preferred configuration is to provide the flexure tongue with a merge finger extending beyond its cantilevered end portion so that a remainder cantilevered end portion remains adjacent a base of the finger. With this arrangement the finger can be employed with a merge comb for merge operations and the cantilevered end portion adjacent the base of the finger can be employed for pitch control. Pitch control is achieved by providing a tab which extends from the load beam and captures the remainder cantilevered end portion for preventing the flexure tongue from pitching beyond its elastic limit. Since the merge finger extends beyond the cantilevered end portion of the flexure tongue, many combinations can be employed for obtaining a desirable merge of multiple suspensions. Ideally, when the merge finger compresses the flexure tongue extension against the load beam surface and lifts the suspension into the merge position the slider assumes a parallel relationship with the disk. In another embodiment the merge finger of each of multiple HGAs can be provided with an offset height so that air bearing surfaces of multiple sliders are positioned parallel with respect to one another when multiple merge fingers are engaged by a merge comb. The same result can be obtained with another embodiment in which the merge finger is provided with a predetermined flexibility. Still another embodiment achieves the same result by providing each tooth of a merge comb with a step cut. In still a further embodiment, the load beam is provided with protrusions which predetermine the rotation of the flexure tongue.

An important advantage of the present invention is that three point fixation of the slider can be achieved during merge so that the slider is normalized in both pitch and roll. This is accomplished by cooperation of the merge finger with a prior art roll limiter consisting of a pair of wings on the flexure which are captured by a pair of tabs on the load beam. Merge in the present invention results in normalization of pitch due to capture of the merge finger by the merge comb simultaneously with normalization of roll due to capture of the wings of the flexure tongue by the tabs of the load beam. This arrangement maximizes head stacking density while protecting flexures from shock loading. This arrangement also negates the effect of high profile wires during merge. If wires from adjacent suspensions contact each other during merge compression of suspension, they push the sliders apart and thereby reduce the merge clearance of the sliders to the disks.

An object is to provide an HGA which can be employed to ideally position a slider during merge for promoting stacking density and to limit pitch of the slider at other times to prevent bending damage to the HGA.

Another object of the present invention is to provide a flexure tongue which can be employed to limit pitch of an HGA and to position the air bearing surface of a slider parallel to other air bearing surfaces of other sliders.

A further object is to provide a uniquely configured flexure tongue which enables various arrangements for achieving pitch normalization during merge.

Still another object is to provide merge components which will optimize stacking density of a head stack assembly during merge.

Still a further object is to provide a high stack density magnetic disk drive which is shock protected.

Still another object is to limit motion of the slider during manufacturing and assembly operations to prevent wire fatigue and broken wires.

Other objects and advantages of the present invention will be readily appreciated upon reading the following description taken together with the accompanying drawings.

BRIEF DESCRIPTION OF THE DRAWINGS

FIG. 7 is an isometric view of the present suspension with a portion of the load beam cut away.

FIG. 8 is a top isometric illustration of the HGA with a portion of the flexure cut away.

DESCRIPTION OF THE PREFERRED EMBODIMENT

Figure 1:
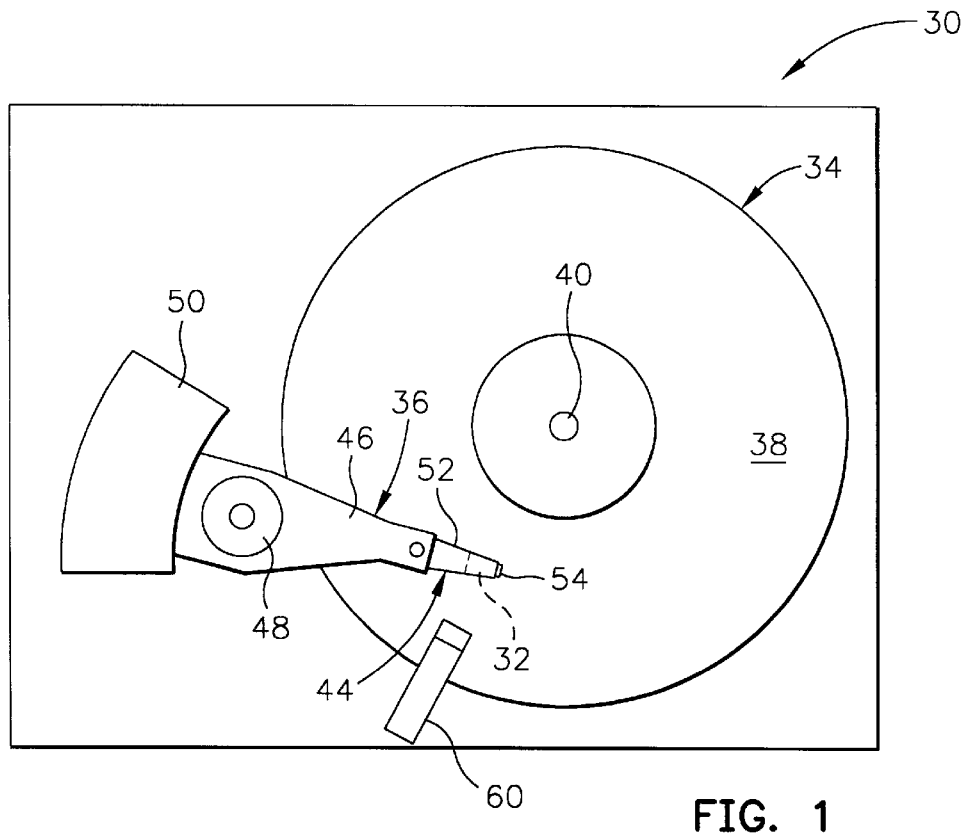
FIG. 1 is a top plan view of a magnetic disk drive.
Figure 2:
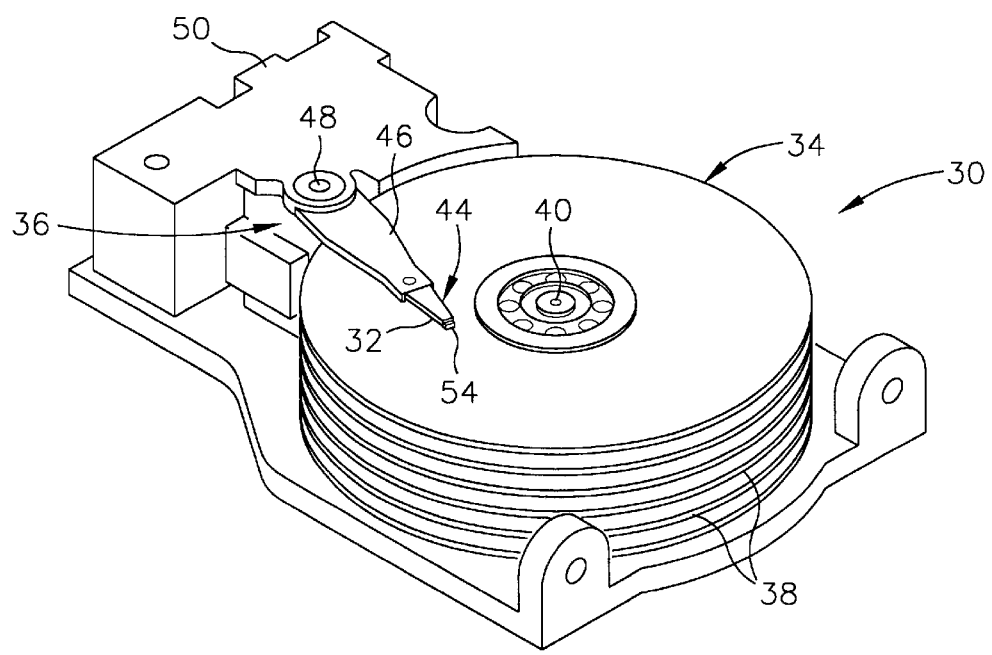
FIG. 2 is a top isometric illustration of the magnetic disk drive.
Figure 3:
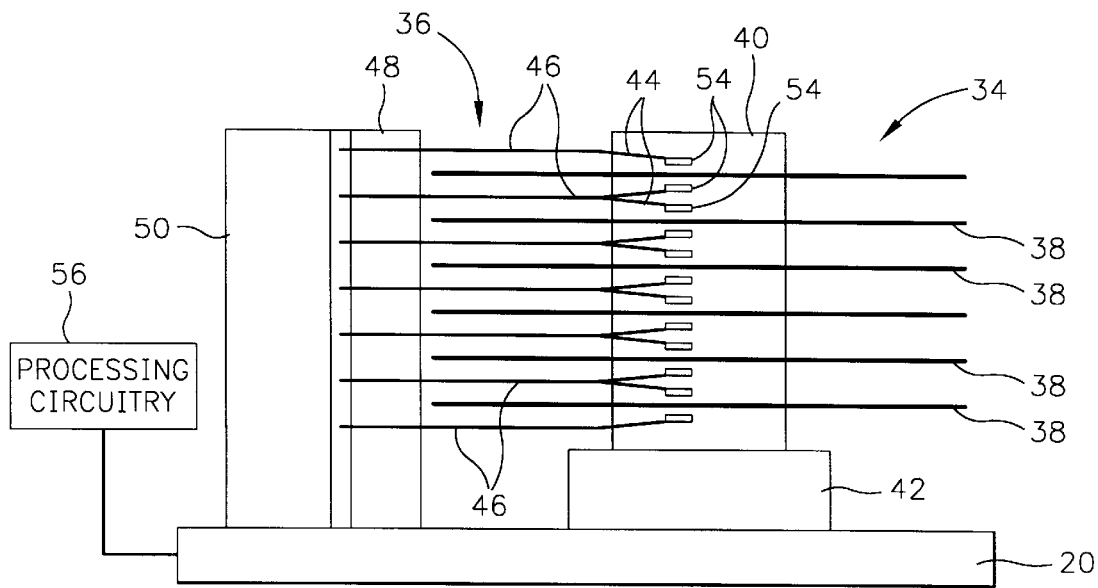
FIG. 3 is a side elevational view of the magnetic disk drive.

Referring now to the drawings wherein like reference numerals designate like or similar parts throughout the several views, there is shown in FIGS. 1, 2, and 3 a magnetic disk drive 30 which employs a head/gimbal assembly (HGA) 32 embodying this invention. The disk drive has a disk stack assembly 34 and a head stack assembly 36. The disk stack assembly 34 includes a plurality of vertically stacked disks 38 which are supported for rotation on a spindle 40, the spindle 40 being rotated by a motor 42. The head stack assembly 36 includes a plurality of vertically stacked suspensions 44, each suspension being mounted to a respective actuator arm 46. Each actuator arm 46 is mounted for rotation on an actuator hub 48 which is selectively rotated by a voice coil 50. Each suspension 44 includes a respective HGA 32 and a load beam 52, the HGA being mounted on the load beam as will be explained in more detail hereinafter. Each HGA 32 includes a slider 54 which carries a magnetic head (shown later) for reading and writing magnetic signals on the disks 38. Processing circuitry 56 is operatively connected to the motor 42, the voice coil 50, and the magnetic heads for rotating the disks 38, selectively rotating the actuator arms 46, and reading and writing on the disks respectively. When the voice coil 50 is operated, the magnetic heads on the slider 54 are moved to selected circular tracks on the disks where magnetic signals are read and written by the heads. Because of direct access to these circular tracks by simple rotation of the actuator arms 46, this type of storage device is known as a direct access storage device (DASD).

Each load beam 52 preloads a respective slider 54 on a surface of a disk 38. When the disks 38 are rotated, each disk creates a cushion of air called an air bearing which counterbalances preloading of the load beam 52 causing a slider to fly slightly off of the surface of a disk, in the order of 0.075 microns. The surface of the slider, which is supported by this air bearing, is known as an air bearing surface (ABS). In some embodiments, the surface of the disk 38 may be provided with a lubricant allowing the ABS of the slider to slightly contact the surface of the disk when the disks are rotated. The HGA 32 of the present invention allows for slight movements in pitch and roll of the slider 54 during rotation of the magnetic disk 38. The HGA is a very delicate component which can be rotated in pitch beyond its elastic limit in response to shock loading caused by dropping or sudden acceleration of the disk drive. This may result in a permanent bend of the HGA which can render the drive inoperable. One of the purposes of this invention is to limit the pitch movement of the HGA when shock loading occurs.

Figure 4:
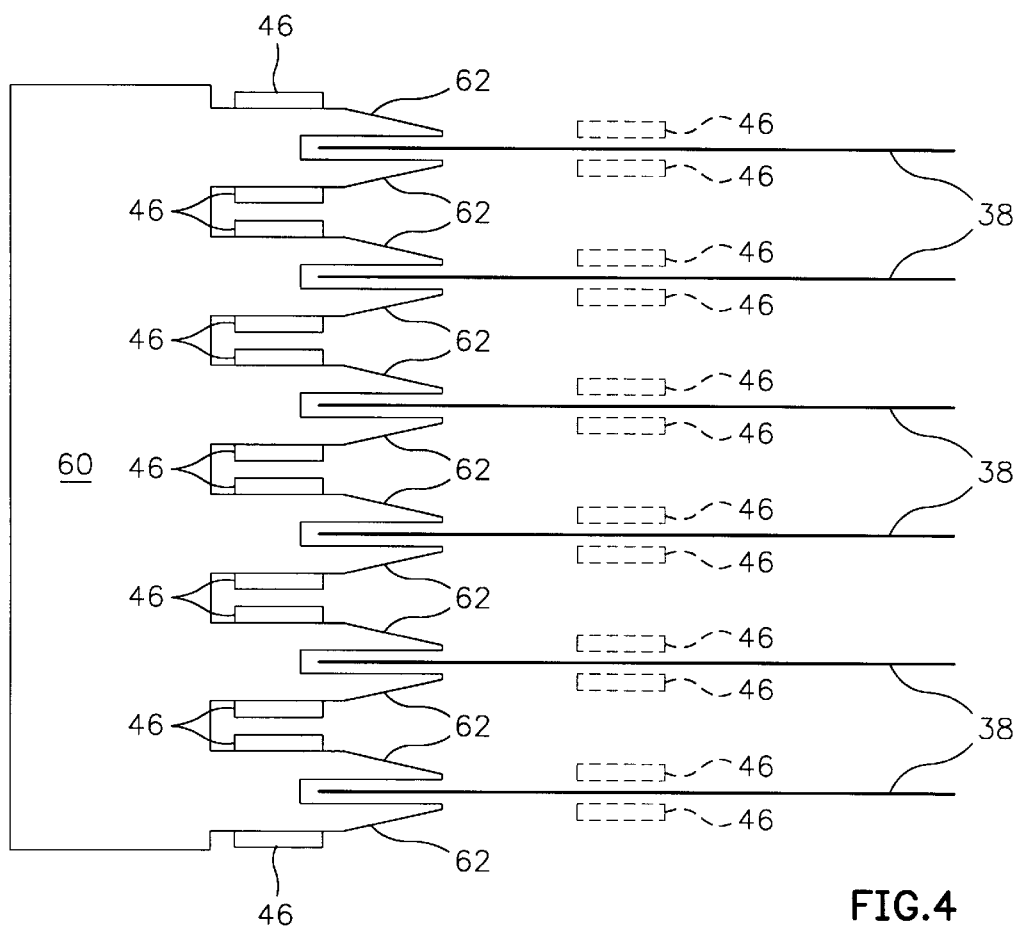
FIG. 4 is a side schematic illustration of a disk drive and merge comb with suspensions shown operationally in phantom and engaging the merge comb in full when non-operational.

Stacking density of the disk stack assembly 34 increases the storage capacity of the disk drive 30. Accordingly, there is a strong felt need for reducing the spacing between the disks 38 as much as practical under the circumstances. In the manufacture of the disk drive, the disk stack assembly 34 and the head stack assembly 36 are manufactured separately and then combined, as shown in FIG. 3, by a very delicate assembly step. In order to promote disk stacking density, this step is accomplished by compressing pairs of suspensions between the disks as well as spreading the top and bottom suspensions in the drive so that the head stack assembly 36 can be assembled into the disk stack assembly 38 without the sliders 54 dragging across the surfaces of the disks. A single head dragging on a disk at this assembly step necessitates the disassembly and rework of the HGA and disk stacks, which is a very costly procedure. This operation is known as "merge" and is typically implemented with a merge comb 60 as shown in FIGS. 1 and 4. The merge comb 60 has a plurality of teeth or fingers 62 which interlace with the suspensions 46 so that these suspensions can be inserted in a compressed state within the disk stack assembly 34. In the prior art the merge comb engages the load beams 52 to cause a slight rotation of the sliders 54 in pitch, reducing the clearance between the sliders and the disks 38. In a prior art disk drive, the nominal merge clearance is about 0.185 mm from the slider to the disk. With the prior art merge arrangement, the slider rotates 0.6 degrees in pitch resulting in a reduction of merge clearance of about 0.01 mm at the leading edge of the slider. There is a strong felt need to normalize pitch to zero which would result in an increase in merge clearance for this arrangement. This would then allow the disks 38 in the disk stack assembly 34 to be stacked slightly closer together which would result in increased storage capacity of the disk drive.

Figures 5, 6:
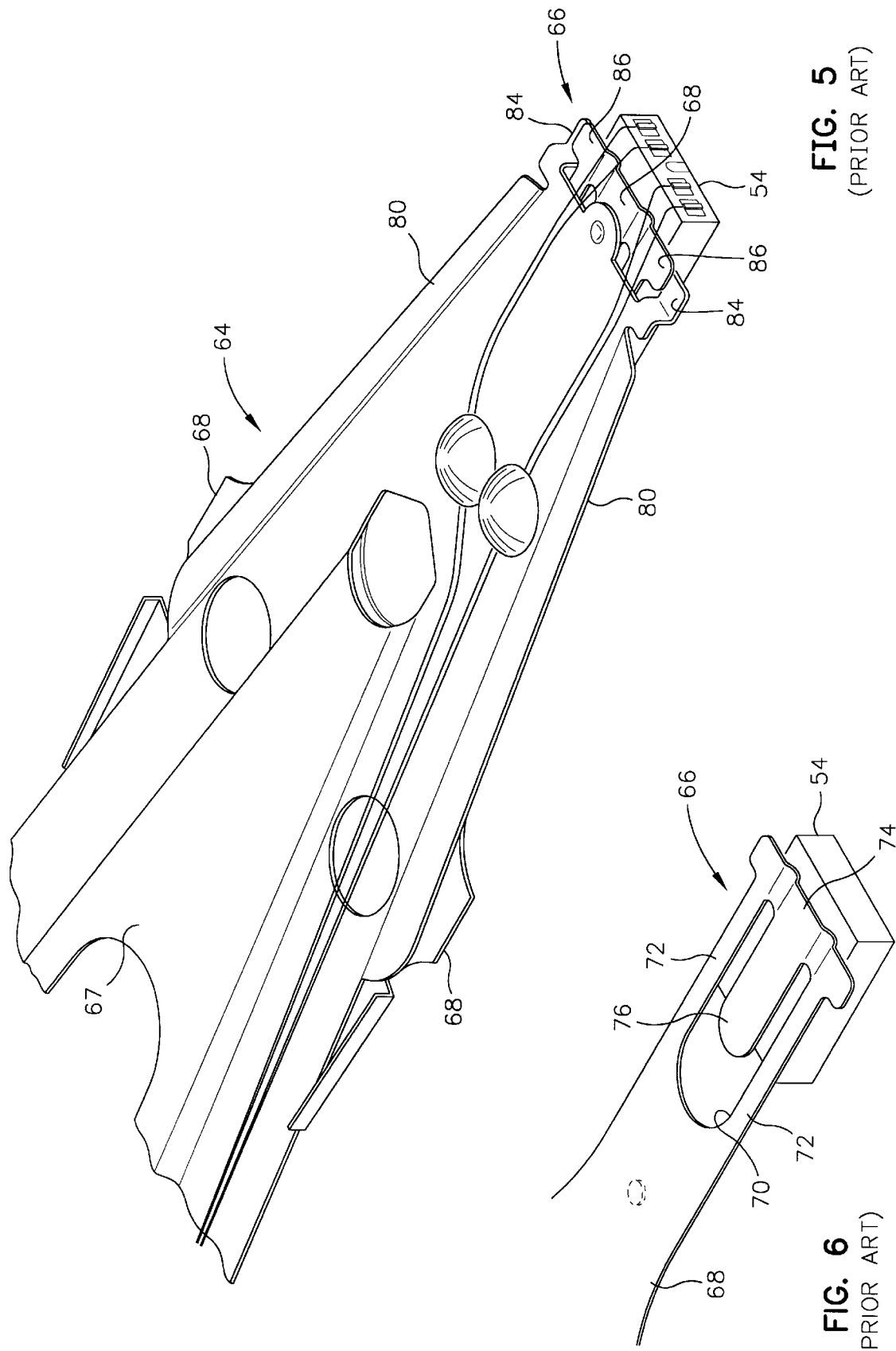
FIG. 5 is an isometric illustration of a prior art suspension with a portion of the load beam cut away.
FIG. 6 is a top isometric view of a prior art head/gimbal assembly (HGA) with a portion of the flexure cut away.
Figure 9:
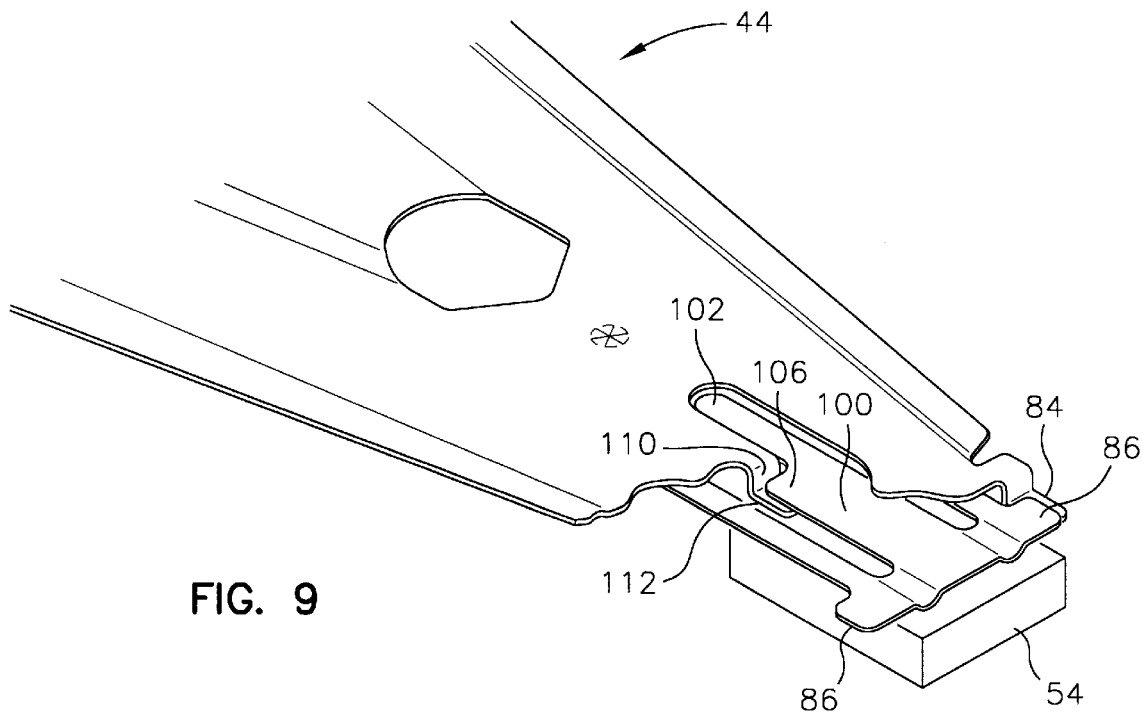
FIG. 9 is a top isometric illustration of the suspension with a portion of the load beam and a portion of the flexure cut away.
Figure 10:
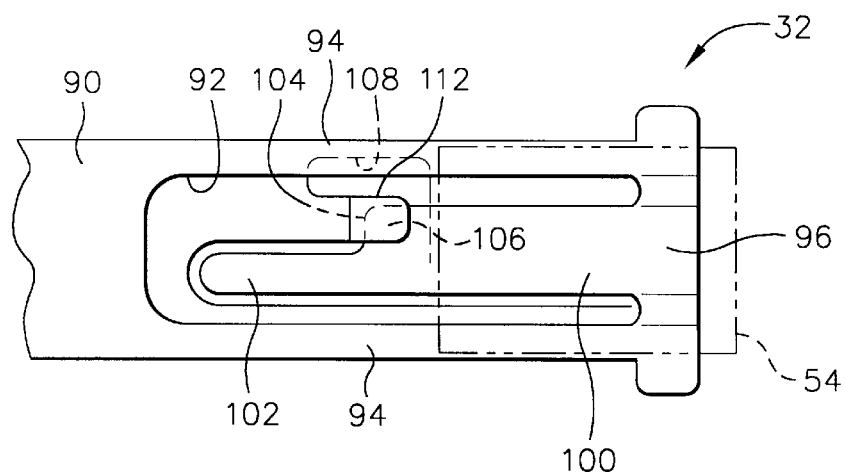
FIG. 10 is a bottom plan view of the HGA with a portion of the flexure cut away and the slider shown in phantom.

In FIG. 5 there is shown a prior art suspension 64 which includes a prior art HGA 66 mounted to a prior art load beam 67. As shown in FIG. 6, the prior art HGA 66 includes a prior art flexure 68 which is a thin sheet of stainless steel. The flexure 68 has a window 70 bounded in part by a pair of legs 72 and a terminal end portion 74. Extending into and cantilevered within the window 70 is a tongue 76. The tongue 76 is connected at its base to the terminal end portion 74. The slider 54 is connected to the tongue 76 by any suitable means such as adhesive bonding so that the tongue 76 acts as a gimbal for movements of the slider 54 in roll and pitch during rotation of an adjacent disk in the disk drive. The thickness of the flexure is typically 0.02 to 0.03 mm. The thickness of the load beam 52 is typically 0.05 to 0.08 mm. As a comparison, the thickness of an ordinary piece of paper is 0.1 mm. A portion of the length of the load beam 67 has side flanges 80 which stiffen the beam, leaving a portion of the load beam, which extends from these side flanges to the actuator arm (see FIG. 1), for resiliently biasing (preloading) the slider toward the surface of a magnetic disk. As shown in FIG. 5, the load beam 67 includes a pair of tabs 84 which are positioned slightly below wings 86 that extend laterally from the flexure 68. This arrangement is known as a "roll limiter" since the HGA 66 is limited in its roll by the tabs 84. The prior art suspension shown does not have a pitch limiter to prevent the flexure 68 of the HGA 66 from pitching beyond its elastic limits. There is no provision made by the prior art suspension 64 for pitch normalization of the sliders during assembly of the head stack assembly into the disk stack assembly as discussed hereinabove. The prior art flexure tongue may extend slightly beyond the slider for inspection of adhesive spread between the flexure tongue and the slider for bonding purposes.

The free end of the novel suspension 44, which is illustrated in FIG. 7, shows the HGA 32 mounted to the load beam 52. Both the HGA 32 and the load beam 52 of this invention are different from the prior art HGA 66 and load beam 67 shown in FIG. 5. As shown in FIG. 8, the present HGA 32 includes a flexure 90 which has a window 92, the window being bounded in part by legs 94 and terminal end portion 96. Cantilevered within the window 92 is a specially configured tongue 100 which extends from the terminal end portion 96 of the flexure. The tongue 100 has a finger 102 which extends from a cantilevered end portion 104, the finger 102 being to one side of the cantilevered end portion 104 so that a remaining cantilevered end portion 106 remains adjacent the base of the finger 102. As will be explained in more detail hereinafter, the finger 102 enables merge normalization of the slider 54. The slider 54 is attached to the tongue with the remaining end portion 106 and the tongue 102 extending beyond the rear edge 107 of the slider. In any event the extension of the tongue beyond the edge 107 should be at least ¾ the width of the tongue attached to the slider for implementing merge normalization.

Figure 11:
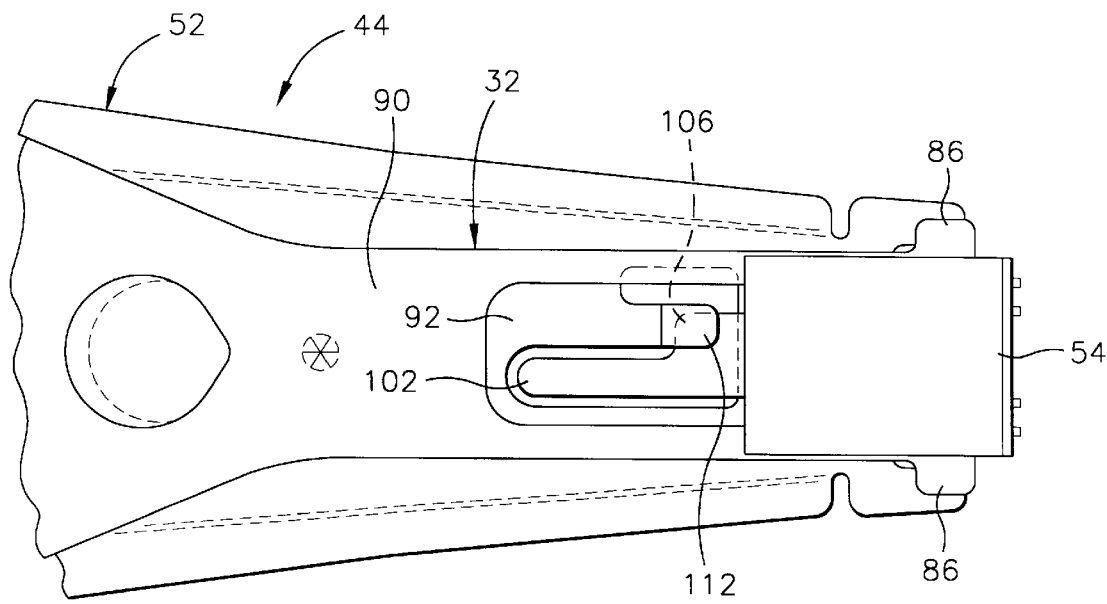
FIG. 11 is a bottom plan view of the present HGA and load beam.
Figure 12:
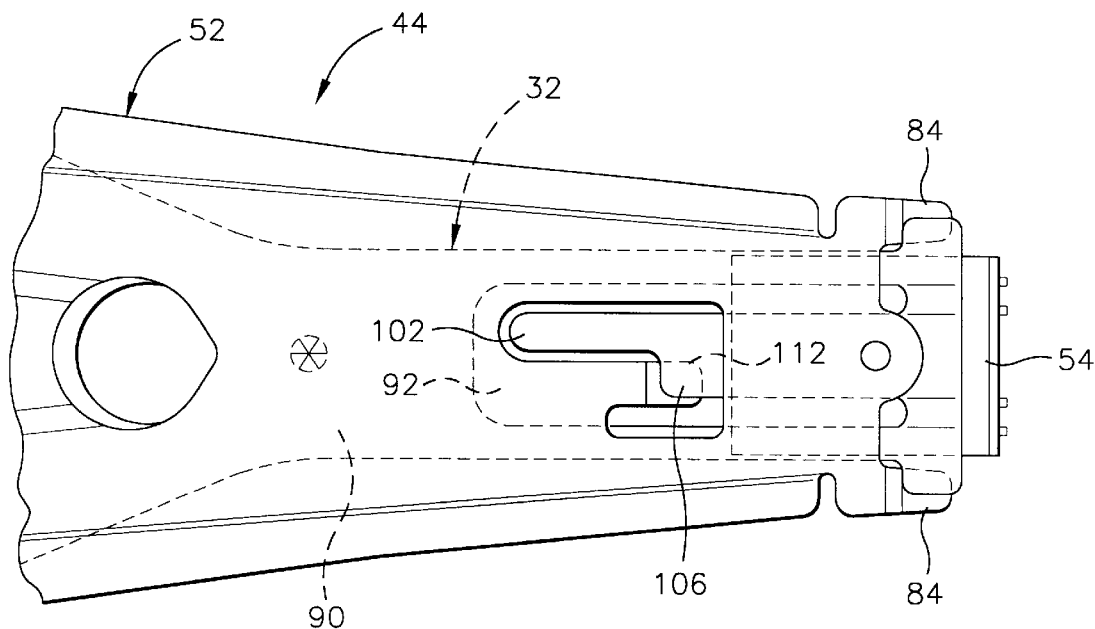
FIG. 12 is a top plan view of the present load beam with the HGA shown in hidden lines there below.
Figure 13:
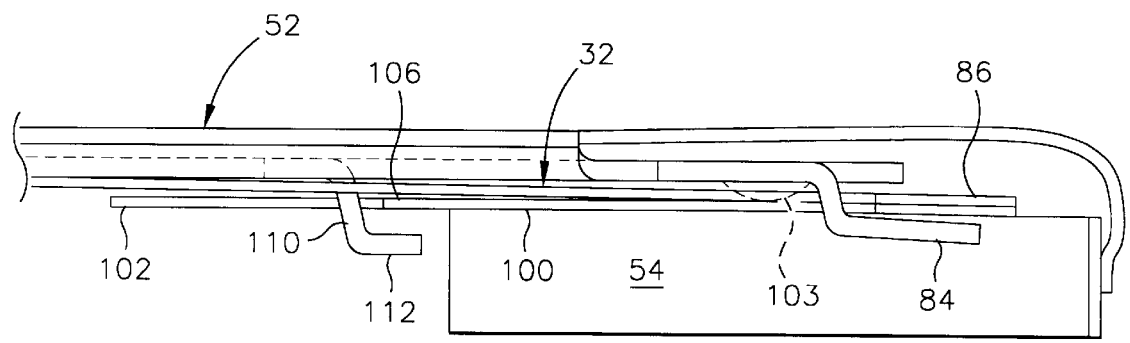
FIG. 13 is a side view of the present load beam and HGA with the air bearing surface of a slider shown in a horizontal position.
Figure 14:
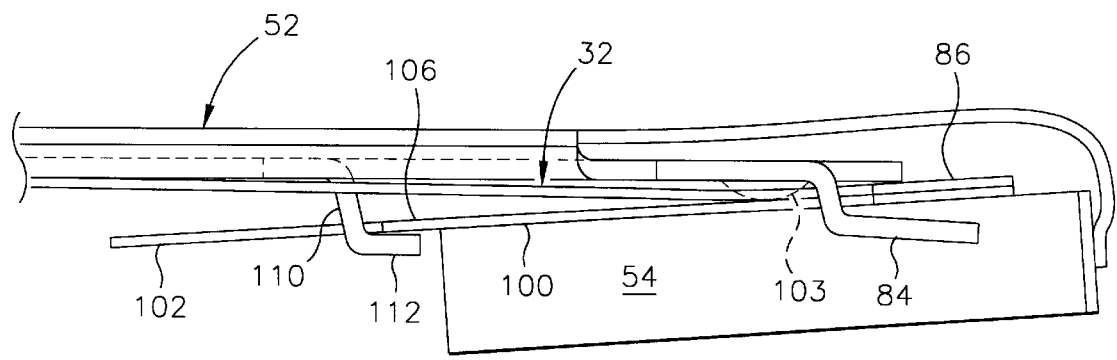
FIG. 14 is the same as FIG. 13 except the air bearing surface of the slider has been rotated in pitch and stopped by a pitch limiter of the present invention.

As shown in FIGS. 13 and 14, the load beam 52 may be provided with a load dome 103 which engages the tongue 100 at a pivot point where the tongue rocks as a gimbal in all directions about the pivot point, limited only by the pitch and roll limiters. Alternatively, the load dome could be provided on the tongue for engagement with the load beam at a pivot point. FIGS. 11 and 12 illustrate additional details of the pitch and roll limiters, the illustration in FIG. 11 being a bottom plan view of the free end portion of the suspension 44 and the illustration in FIG. 12 being a top plan view of the free end portion of the suspension. As shown in FIGS. 7, and 9–14, the load beam 52 is provided with an arrangement for limiting pitch of the slider. The load beam 52 is provided with a cutout 108 with the exception of a remainder portion which has a downwardly extending portion 110 and a generally horizontally extending tab portion 112. As shown best in FIGS. 13 and 14, the tab 112 extends below the cantilevered end portion 106 of the tongue thereby limiting pitch movement of the slider to a small angle, such as 2°. FIG. 14 shows the slider 54 limited in its pitch by engagement of the cantilevered end portion 106 of the tongue with the tab 112. This arrangement prevents bending of the flexure beyond its elastic limit. With this arrangement, the HGA 32 is now limited in both pitch and roll and its flexure will not become permanently bent upon the occurrence of undesirable shock loading. This arrangement also preserves integrity of the HGA during manufacture of the suspensions and the head stack assembly prior to assembling the head stack assembly into the disk stack assembly. The cutout 108 is also adjacent the finger 102 for allowing space for movement of the finger 102. This arrangement relaxes the tolerances for the various components of the HGA.

Figure 15:
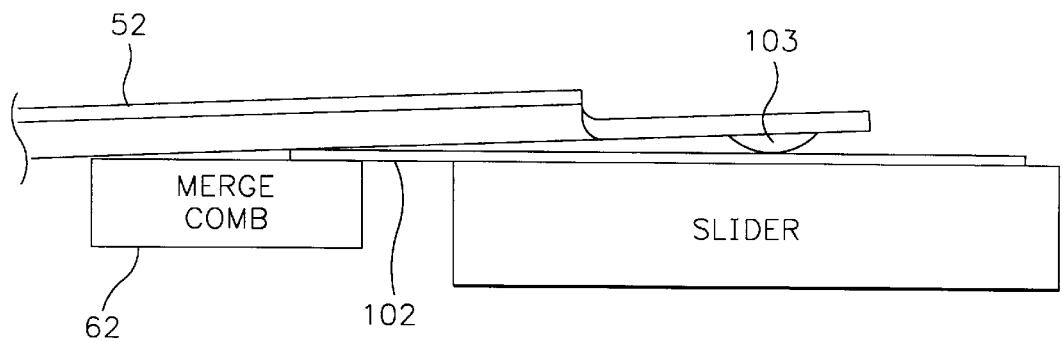
FIG. 15 is still another embodiment for obtaining merge normalization with a bowed end portion of the load beam.
Figure 16:
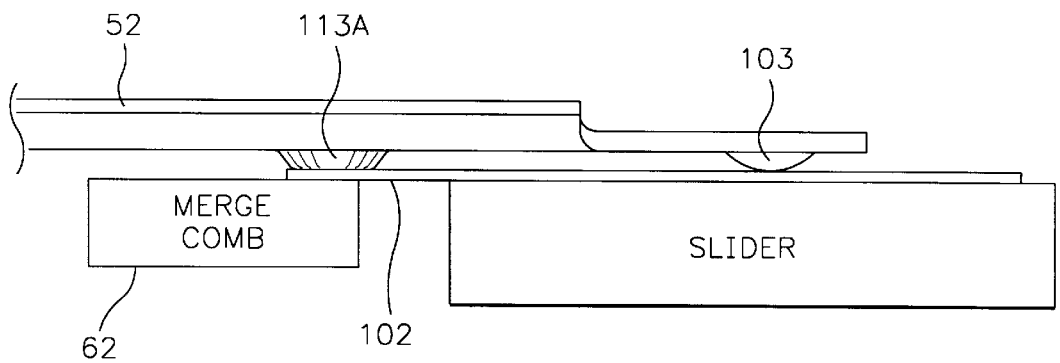
FIG. 16 is still a further embodiment for obtaining merge normalization with a protrusion on the load beam.
Figure 17:
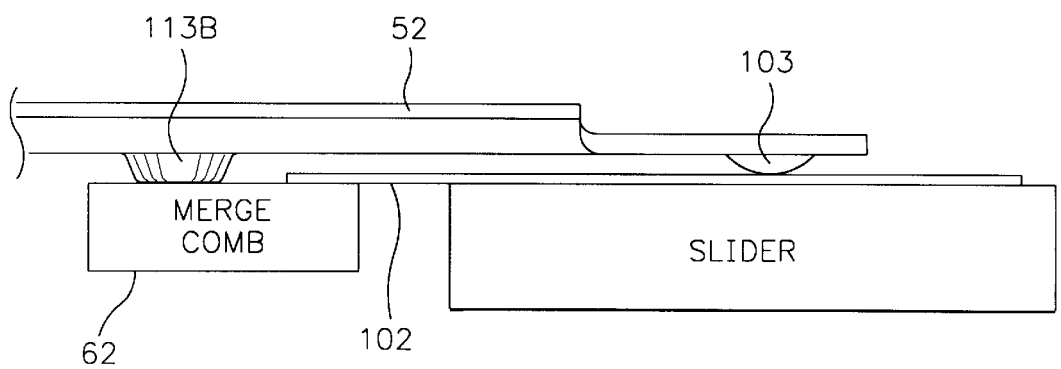
FIG. 17 is still another embodiment for obtaining merge normalization with an alternate protrusion on the load beam.
Figure 18:
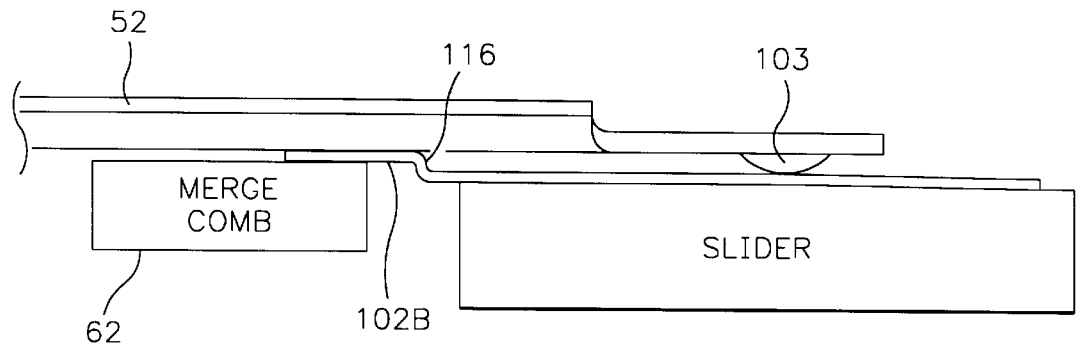
FIG. 18 is a side schematic illustration of a finger embodiment of the HGA merged with a merge comb.
Figure 19:
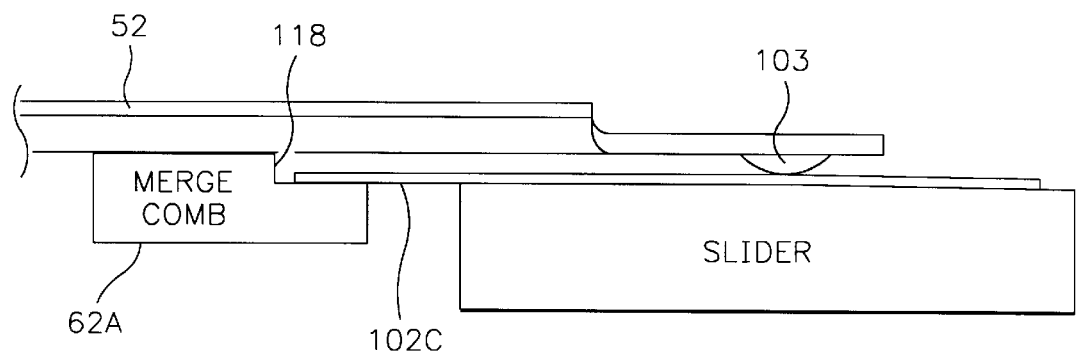
FIG. 19 is another finger embodiment of the present HGA merged with a merge comb.
Figure 20:
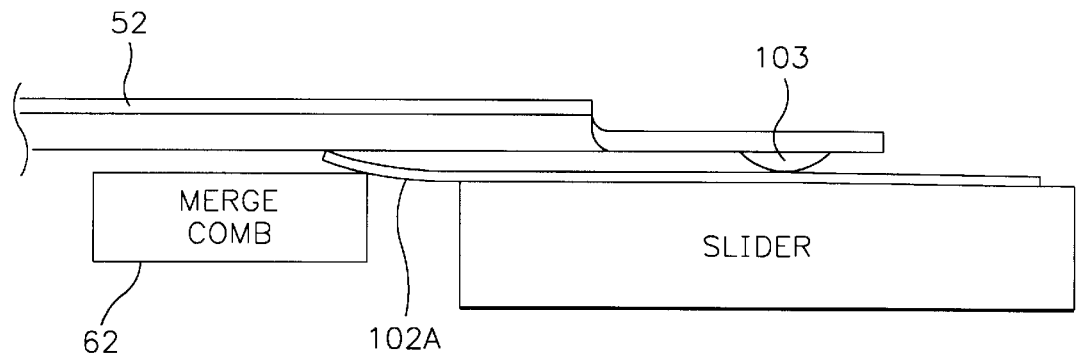
FIG. 20 is a further embodiment for obtaining merge normalization with an offset tooth of a merge comb.

FIGS. 15 to 20 illustrate various embodiments of an engagement of the flexure finger 102 with a merge comb finger 62 for normalizing pitch of the air bearing surface of the slider to 0°. A preferred embodiment is shown in FIG. 15 wherein the load beam is configured at an angle relative to the disk during operation such that during merge compression the flexure tongue is pushed against the load beam by the merge comb resulting in a zero pitch angle of the slider relative to the disk. The angle or bow of the load beam is due to the fixation of the load beam to the actuator which angles the load beam toward the disk so that when the slider is loaded on the disk the load beam bends away from the disk. In FIGS. 16 and 17 the load beam 52 is configured with formed protrusions which limit the elevation of the merge comb and thereby position the flexure tongue to its ideal zero pitch angle relative to the disks. In FIG. 18 the merge finger 102B is provided with a height step 116 which achieves normalized pitch during merge. In FIG. 19 the merge comb finger 62A is provided with a height step 118 which achieves normalized pitch during merge. In FIG. 20 the flexure finger 102A is configured with a flexibility which is fashioned to achieve normalized pitch of the slider during merge.

Figure 21:
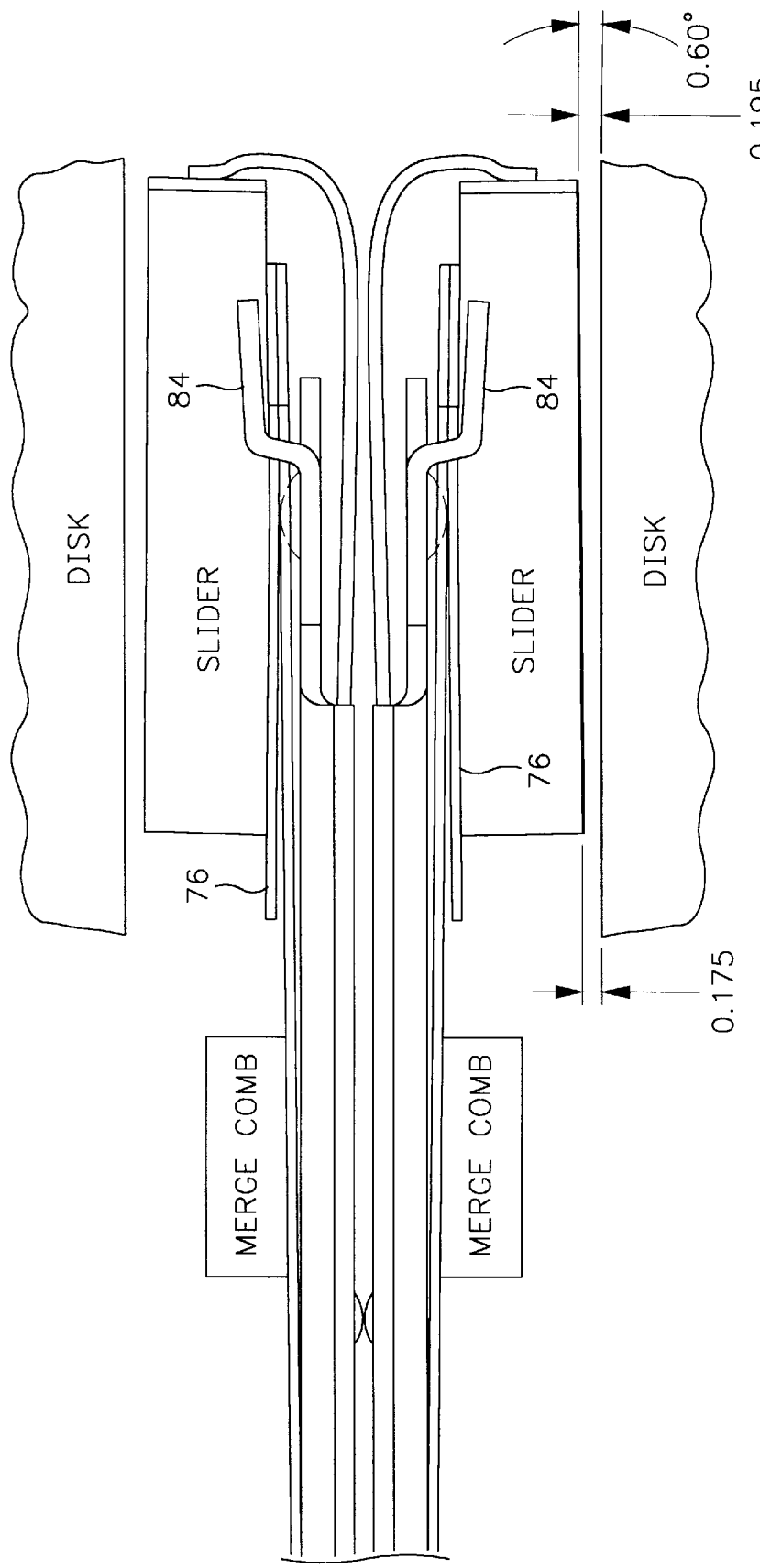
FIG. 21 is a side view of a pair of prior art suspensions showing an angled pitch condition during merge.
Figure 22:
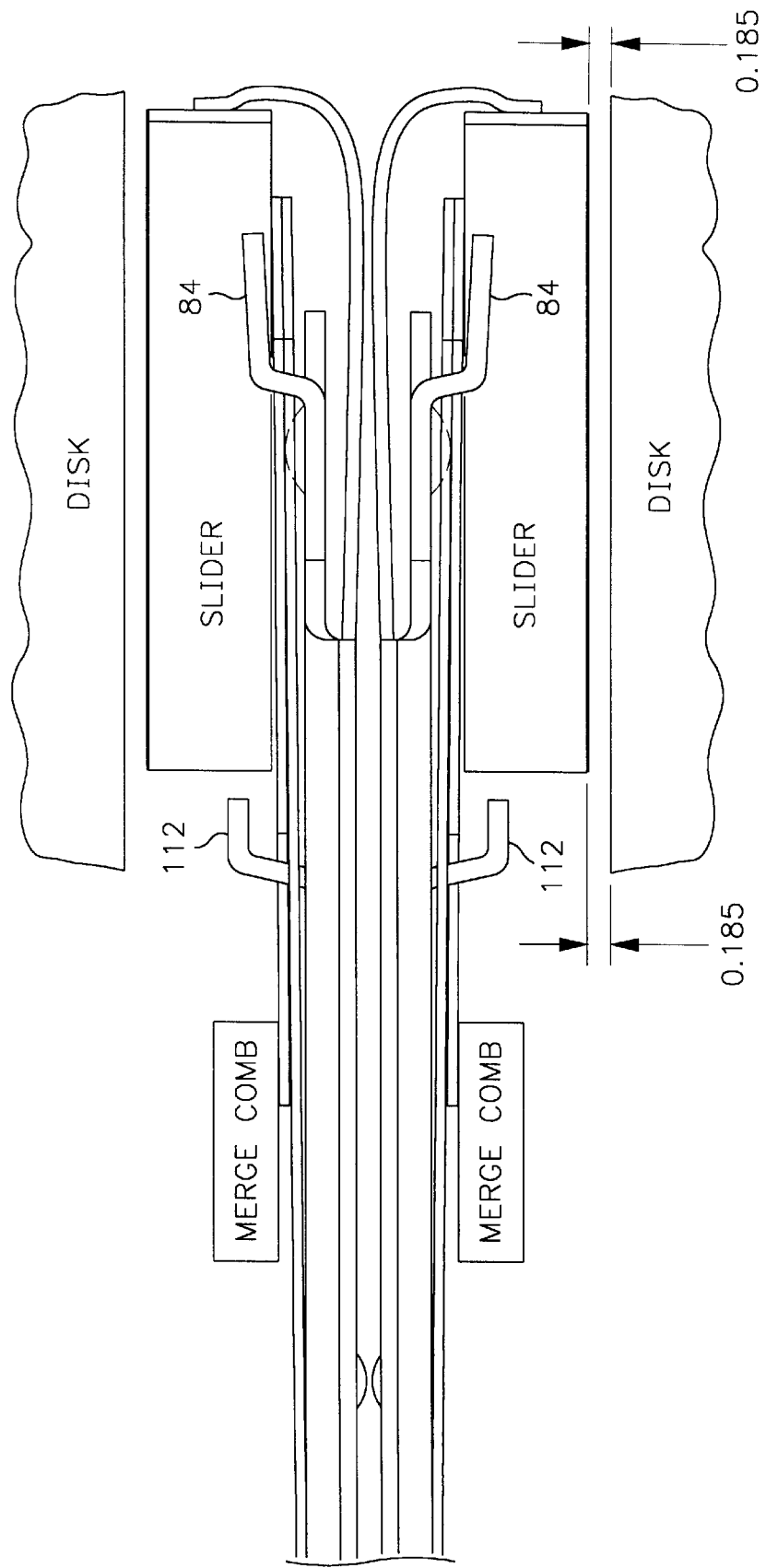
FIG. 22 is a side illustration of a pair of present suspensions showing a zero pitch condition during merge.
Figure 23:
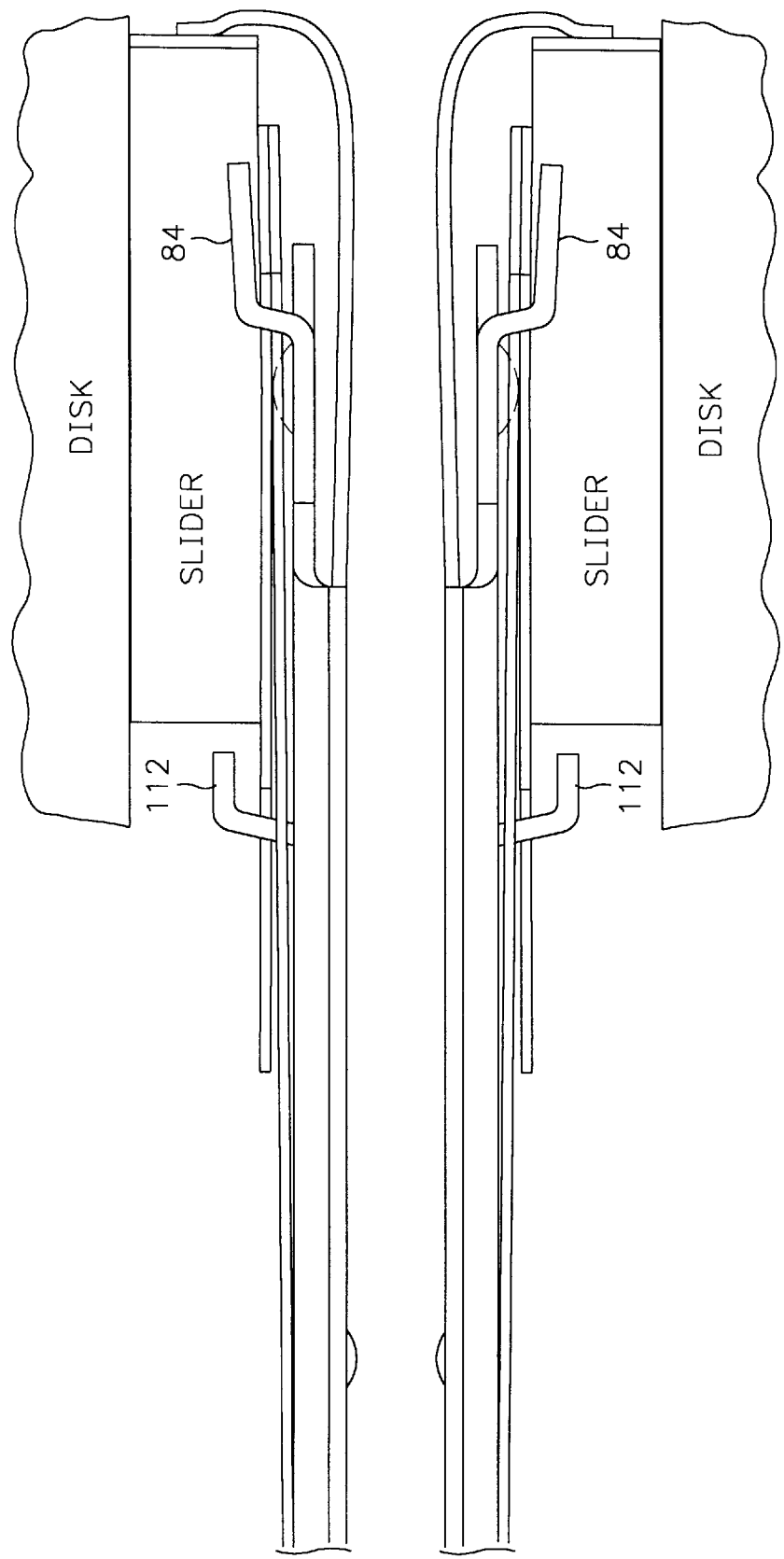
FIG. 23 is a side view of a pair of present suspensions loaded onto a pair of disks.

FIGS. 21–23 illustrate the increase in merge clearance which can be obtained by the present invention. FIG. 23 shows side views of a pair of head gimbal assemblies in their functional configuration in a disk drive assembly. In FIG. 21 a merge of a pair of prior art suspensions results in a leading edge of the slider being spaced from the surface of the disk about 0.175 mm and the trailing edge of the slider being spaced from the surface of the disk about 0.195 mm. This is about a 0.60° pitch angle relative to the disk. With the present invention, the pitch rotation can be corrected to zero, as shown in FIG. 22, with even spacing between the air bearing surface of the slider and the surface of the disk of about 0.185 mm. This is an improvement over the prior art merge shown in FIG. 21 of about 0.01 mm. This is also a 5% increase in merge clearance which enables greater stacking density of the disks in the disk stacking assembly 34. It should be noted from FIGS. 15–20 that the present flexure tongue 102 enables various combinations for achieving normalized pitch of the slider.

In FIG. 23 the suspensions are shown loaded onto the disks. This is a condition of preloading which is caused by resilient biasing of the HGAs by the load beams. Because of the gimballing action of the tongue, the air bearing surfaces of the sliders assume parallel relationships with the surfaces of the disks. When the disks are rotated, the sliders may literally fly a short distance from the surfaces of the disks on the aforementioned air bearing or slightly contact a lightly lubricated surface of the disks so that a magnetic head (not shown) carried by each slider can read and write magnetic signals on the disk.

Figure 24:
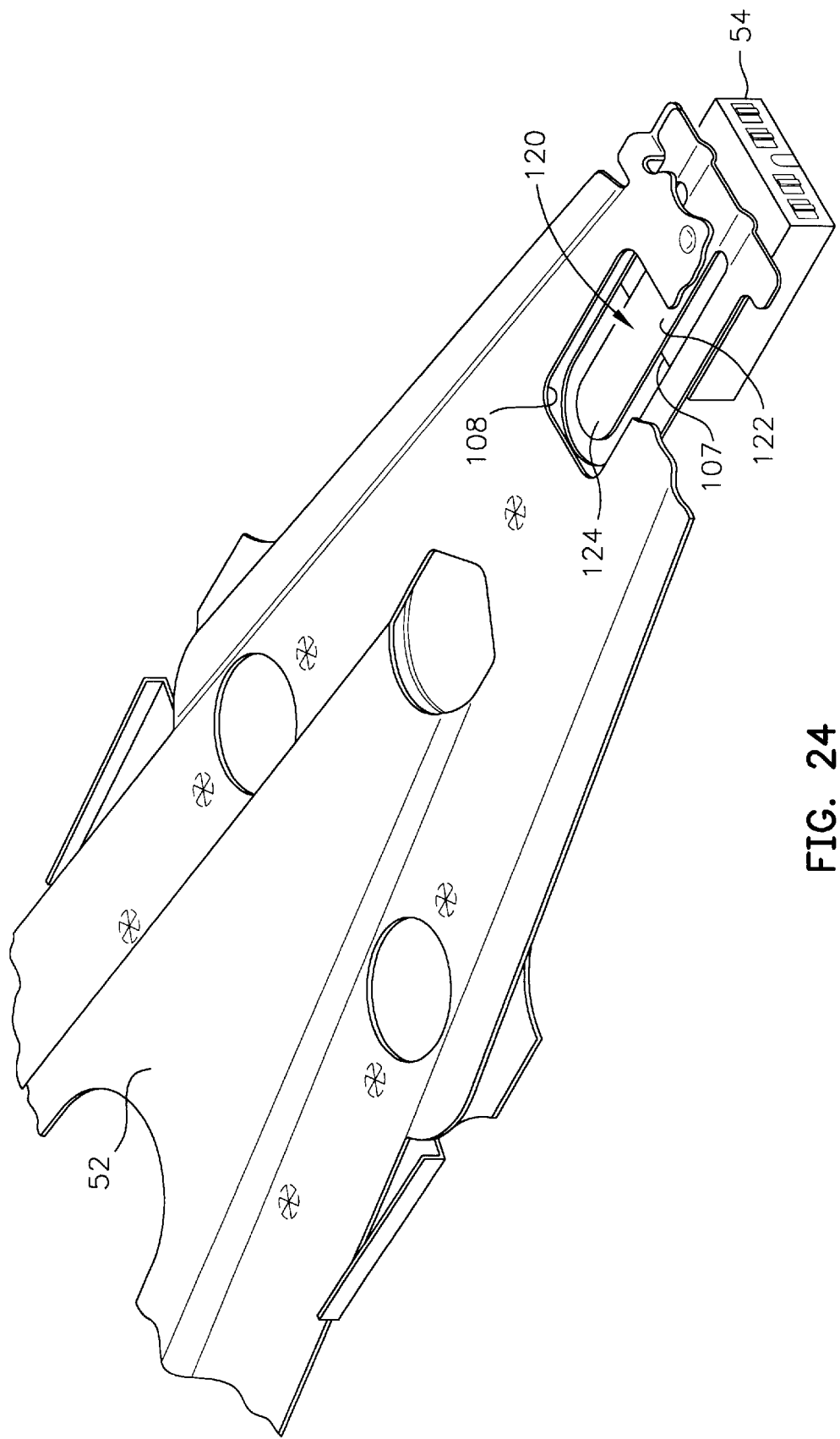
FIG. 24 is another embodiment of the tongue for obtaining merge normalization.

In FIG. 24 the finger 102 and the pitch limiter 112 are not employed. A tongue has first and second portions 122 and 124 with the slider 54 mounted to the first portion 122 so that the second portion 124 extends beyond the edge 107 of the slider for engaging the merge comb 60 for merge normalization. The second portion 124 should extend beyond edge 107 at least ¾ the width of the tongue 120 to achieve this purpose. An opening 108 is provided adjacent the second portion 124 of the tongue for clearance purposes as discussed hereinabove.

The present invention has provided a flexure tongue which is uniquely configured to enable normalized pitch of a slider during merge and enable limited pitch of the slider during construction and after installation in a drive to protect the HGA from severe shock loads. Accordingly, the flexure tongue enables a double function which has not been achievable by the prior art. When the merge comb is inserted in the head stack assembly, all of the suspensions are compressed to a normalized pitch condition with the sliders restrained in pitch and roll by a three-point fixation caused by the flexure tongue extension and roll limiters. It should be understood that the terms "above" and "below" are to be considered as used interchangeably in this description since the air bearing surface of a slider can either face upwardly or downwardly, as shown in FIG. 2.

While the preferred embodiments of the present invention have been illustrated in detail, it should be apparent that modifications and adaptations to those embodiments may occur to one skilled in the art without departing from the scope of the present invention as set forth in the following claims.

We claim:

1. A head/gimbal assembly comprising:

a flexure which has a window, the window being partially bounded by a pair of legs and a terminal end portion of the flexure;

a tongue, which has first and second portions, extending from the terminal end portion of the flexure into said window;

a slider mounted to the first portion of the tongue; and the second portion of the tongue having a finger which extends from the slider leaving a remainder portion of the tongue adjacent to a base of said finger.

2. A suspension as claimed in claim 1 comprising:

said finger having a height offset end portion so that when said height offset portion of the finger is engaged by a merge comb the air bearing surface of the slider is normalized to a desired position.

3. A suspension as claimed in claim 1 comprising:

said finger being flexible so that when the finger is engaged by a merge comb the air bearing surface of the slider is normalized to a desired position.

4. A flexure comprising:

a thin flexible plate;

the plate having a window, the window being partially bounded by a pair of legs and a terminal end portion of the plate;

a tongue extending from the terminal end portion of the plate into said window and having a cantilevered end portion positioned therein; and the tongue having a finger which extends from the cantilevered end portion leaving a remainder cantilevered end portion adjacent to a base of said finger.

5. A suspension as claimed in claim 4 comprising:

said finger having a height offset end portion.

* * * * *